US011938654B2

(12) United States Patent
Huang et al.

(10) Patent No.: US 11,938,654 B2
(45) Date of Patent: Mar. 26, 2024

(54) SPOOL WITH SAW WIRE HAVING ELASTIC AND PLASTIC ROTATIONS

(71) Applicant: BEKAERT BINJIANG STEEL CORD CO., LTD., Jiangsu (CN)

(72) Inventors: Wenxian Huang, Jiangsu (CN); Kurt Van Rysselberge, Jiangsu (BE); Igor Ruzansky, Nitra (SK)

(73) Assignee: BEKAERT BINJIANG STEEL CORD CO., LTD., Jiangsu (CN)

( * ) Notice: Subject to any disclaimer, the term of this patent is extended or adjusted under 35 U.S.C. 154(b) by 1287 days.

(21) Appl. No.: 16/474,382

(22) PCT Filed: Dec. 26, 2017

(86) PCT No.: PCT/CN2017/118550
§ 371 (c)(1),
(2) Date: Jun. 27, 2019

(87) PCT Pub. No.: WO2018/126945
PCT Pub. Date: Jul. 12, 2018

(65) Prior Publication Data
US 2019/0337188 A1 Nov. 7, 2019

(30) Foreign Application Priority Data

Jan. 9, 2017 (CN) .......................... 201710014922.1
Jan. 9, 2017 (CN) .......................... 201720021333.1

(51) Int. Cl.
*B28D 5/04* (2006.01)
*B28D 5/00* (2006.01)

(52) U.S. Cl.
CPC ............ *B28D 5/045* (2013.01); *B28D 5/0058* (2013.01)

(58) Field of Classification Search
CPC .......... B28D 5/045; B28D 1/08; B28D 1/124; B24B 27/0633
See application file for complete search history.

(56) References Cited

U.S. PATENT DOCUMENTS 2,709,553 A * 5/1955 Wellcome .............. B65H 55/00
242/593
9,610,641 B2 4/2017 Vaubourg
(Continued)

FOREIGN PATENT DOCUMENTS

CN 102756176 10/2012
CN 104290207 1/2015
(Continued)

OTHER PUBLICATIONS

International Search Report dated Mar. 29, 2018 in International Application No. PCT/CN2017/118550.
(Continued)

*Primary Examiner* — Joel D Crandall
(74) *Attorney, Agent, or Firm* — Wenderoth, Lind & Ponack, L.L.P.

(57) ABSTRACT

A spool of saw wire is disclosed. The saw wire is wound on the core of the spool (718). The saw wire is made of steel wire (406) wherein two or more crimp deformations are implemented. Each of said two or more crimp deformations has a crimp direction that is perpendicular to the longitudinal axis. Each of the crimp directions is different from the other crimp directions. The saw wire on the spool comprises a number of elastic rotations per unit length applied in the elastic rotation direction. The spool with saw wire can give excellent processability in the sawing process.

14 Claims, 7 Drawing Sheets

(56) References Cited

U.S. PATENT DOCUMENTS

| | | | | |
|---|---|---|---|---|
| 2009/0090344 A1* | 4/2009 | Vaubourg | ............... | B23D 61/18 299/35 |
| 2013/0061842 A1* | 3/2013 | Junge | ..................... | B28D 5/045 125/21 |
| 2015/0314484 A1* | 11/2015 | Pietsch | .............. | B23D 57/0053 125/21 |

FOREIGN PATENT DOCUMENTS

| | | | | | |
|---|---|---|---|---|---|
| CN | 204912935 | | 12/2015 | | |
| CN | 206748775 | | 12/2017 | | |
| JP | H01143345 U | * | 10/1989 | | |
| KR | 2013049465 A | * | 5/2013 | ............. | B23D 61/18 |
| WO | 95/16816 | | 6/1995 | | |
| WO | 99/28547 | | 6/1999 | | |
| WO | 2006/067062 | | 6/2006 | | |
| WO | 2012/069314 | | 5/2012 | | |
| WO | WO-2012069314 A1 | * | 5/2012 | ........... | B23D 61/185 |
| WO | 2012/171754 | | 12/2012 | | |
| WO | WO-2015119343 A1 | * | 8/2015 | ........... | B23D 61/185 |
| WO | WO-2015119344 A1 | * | 8/2015 | ............. | B23D 61/18 |

OTHER PUBLICATIONS

Writetn Opinion of the International Searching Authority dated Mar. 29, 2018 in International Application No. PCT/CN2017/118550.

* cited by examiner

SPOOL WITH SAW WIRE HAVING ELASTIC AND PLASTIC ROTATIONS

TECHNICAL FIELD

The invention relates to a spool with saw wire. Such spools are used for cutting or sawing hard and brittle materials such as silicon, quartz, gallium arsenide, silicon carbide and similar types of materials.

BACKGROUND ART

Wire saws are machines that are used for cutting hard and brittle materials such as silicon wafers as used in the solar cell industry and the semiconductor industry. In a wire saw a long (typically more than 200 km, although 700 km is more customary) single saw wire is fed into a wire web at the feed side of the wire saw machine. A wire web is formed by a series of loops (typically between 100 and 1200 loops) guided on grooved capstans in a spiralled fashion. The capstans move the complete wire in a back and forth movement (e.g. for semiconductor wafers) or in one direction (e.g. for cutting solar cell wafers).

Over the wire web an abrasive slurry is poured that holds abrasive particles in a viscous carrier. Usually silicon carbide or diamond particles are used as abrasive particles while polyethylene glycol (PEG) or oil is used as the carrier. A workpiece—a silicon ingot for example—is sunk into the wire web. The abrasive particles are dragged by the saw wire and abrade away the material of the work piece that exits the cut as swarf. Also the saw wire is abraded in the process and therefore a continuous replenishment of fresh saw wire is needed at that feed side, while used saw wire is collected at the take-up spool of the saw machine.

For proper understanding: a wire saw is a machine to saw, a saw wire is a wire used on such machine for sawing. A 'sawing wire' is the same as a 'saw wire'. Saw wires are steel wires that are by preference very thin. Indeed, the thinner a saw wire is the less material is abraded away and more wafers can be extracted from the same block of material. However, as the wire must be able to sustain a certain working force (typically 25 N) during sawing for keeping the wire taut and to be able to exert a downward pressure on the abrasive, the lower bound of the steel wire diameter is limited by the tensile strength of the wire. Conventional saw wires are substantially straight and have a smooth surface.

In recent years structured saw wires have been introduced. Within the context of this application a 'structured saw wire' is a steel wire that has bends with straight segments in between. I.e. the curvature of the wire will vary between very low values at the straight segments and higher values at the bends themselves. The surface of the steel wire is smooth and the cross section of the wire is round. Typical examples of structured sawing wires in the meaning of the application have been described in WO 2006/067062 that is entirely based on WO 99/28547 A1. Both publications describe a steel filament provided with crimps, each crimp having a pitch length and an amplitude, the crimps being arranged in at least two different planes.

The use of structured sawing wires results in faster sawing, less energy consumption, less wire needed per wafer cut and less slurry usage. This is largely attributed to the fact that the structuring results in a better transportation of the abrasive at the bends. Moreover the structuring provides open space in the cut leading to a better swarf evacuation. Also the very fine used abrasive particles—the debris—will not obstruct the sawing as they pass through the open structure of the wire. See "*Structured wire: from single wire experiments to multi-crystalline silicon wafer mass production*", Solar Energy Materials & Solar Cells 131 (2014) 58-63.

As already disclosed in WO 2012/069314 A1 the above WO 99/28547 A1 wires have the disadvantage that one crimping direction may start to prevail over the other crimping direction during sawing. This is due to the fact that—when viewed along the longitudinal axis of the structured sawing wire—the wire has no circular symmetry: a Lissajous type of trajectory forms within a rectangle. The result is that the wire will find a preferential direction resulting in an increased total thickness variation (TTV) of the wafer, an increased depth and an increased number of saw marks.

While the solution suggested in WO2012/069314 A1 of providing a structured sawing wire having a helicoidal shape comprising segments with bends in between and wherein a gap forms between the segments and the workpiece wherein the abrasive can be held is proven to work, there are obstacles in terms of efficiency of producing such wires.

The inventors therefore sought other solutions to overcome the problem and came up with the solution that will be disclosed hereinafter:

DISCLOSURE OF INVENTION

It is an object of the present invention to provide spools with saw wire such that the saw wire performs better and better sawn wafer characteristics are obtained. It is a further object of the invention to provide a spool with saw wire that will give excellent processability in the sawing process.

According a first aspect of the invention a spool with saw wire is provided i.e. the invention is on a spool in combination with the wire. It is not possible to determine the presence of the invention on a short (for example less than 1 meter) piece of structured saw wire for reasons that will be clarified later on.

The saw wire is wound on the core of the spool. The spool will generally have flanges, but this is not an explicit requirement.

The saw wire has a longitudinal axis that follows the general shape of the saw wire. The axis may show some deviation from the straight line as it is wound on the core of the spool. The longitudinal axis follows this wide circle at the centre of the saw wire. Also when a short wire sample is cut from the spool, the wire may show some long range curvature. In any case any radius of curvature that is equal or larger than half of the core diameter will not prevent of identifying a longitudinal axis of the saw wire.

The saw wire is made from a steel wire. The steel wire has a generally round cross section although a polygonal cross section is not excluded per se. The wire has a diameter of between 60 μm and 300 μm although the most preferred sizes are 70, 80, 90, 100, 110, 115, 120, 130, 140 and 150 μm. Most used nowadays are wires with a diameter of 115 and 120 μm. For special applications known as 'bricketing' larger size diameters of 200 μm or 250 μm are customary. 'Bricketing' is the cutting of a larger ingots into square blocks of standard wafer size. Standard wafer sizes are $100 \times 100$ mm$^2$, $125 \times 125$ mm$^2$ or $156 \times 156$ mm$^2$.

In order to be able to sustain the work load of between 20 to 25 N during sawing, a minimal tensile strength of between 1000 N/mm$^2$ (for thicker wires like between 200 and 300 μm) and 4000 N/mm$^2$ (for a steel wire of 90 μm diameter) is needed. Typically for the most used sizes 100, 110, 115 and 120 μm a minimal tensile strength of respectively 3700, 3200, 2900, 2700 N/mm² wherein a safety is built in of 500 N/mm² to overcome tension fluctuations.

High tensile strengths can only be reached on far drawn, high tensile steel wires. The steel used for drawing such wires is known as high carbon steel that may or may not be micro alloyed. Practical steel compositions do not only comprise iron and carbon but a lot of other alloy and trace elements, some of which have a profound influence on the properties of the steel in terms of strength, ductility, formability, corrosion resistance and so on. As for this application strength is of the essence, the following elemental composition is preferred for the steel wire:

- At least 0.70 wt % of carbon, the upper limit being dependent on the other alloying elements forming the wire (see below)
- A manganese content between 0.20 to 0.70 wt %. Manganese adds—like carbon—to the strain hardening of the wire and also acts as a deoxidiser in the manufacturing of the steel.
- A silicon content between 0.20 to 0.30 wt %. Silicon is used to deoxidise the steel during manufacturing. Like carbon it helps to increase the strain hardening of the steel.
- Presence of elements like aluminium, sulphur (below 0.03%), phosphorous (below 0.30%) should be kept to a minimum.
- The remainder of the steel is iron and other elements The presence of chromium (0.005 to 0.30% wt), vanadium (0.005 to 0.30% wt), nickel (0.05-0.30% wt), molybdenum (0.05-0.25% wt) and boron traces may reduce the formation of grain boundary cementite for carbon contents above the eutectoid composition (0.80% wt C) and thereby improve the formability of the wire. Such alloying enables carbon contents of 0.90 to 1.20% wt, resulting in tensile strengths that can be higher as 4000 MPa in drawn wires. Such steels are known as micro-alloyed steels.

The saw wire is the steel wire that is provided with two or more crimps, each of the two or more crimps having a crimp direction, each of said crimp directions being perpendicular to the longitudinal axis, the crimp directions being mutually different from one another.

For the purpose of this application a 'crimp deformation' is a plastic deformation wherein the wire has obtained a repeated wavy or zig-zag shape in a crimp direction by giving alternating left and right permanent bends to the wire over the length of the wire. The crimp direction is perpendicular to the longitudinal axis. Within the context of this application: whenever reference is made to a 'projection', the projection of the central line of the saw wire is meant. The 'central line' is formed by connecting the centre points of the circles formed in perpendicular cross sections of the steel wire. With 'parallel projection' of a particular crimp deformation is meant the projection of the central line of the saw wire on a plane that is parallel to the longitudinal direction and the particular crimp direction in a view perpendicular to that plane. With 'longitudinal projection' is meant the projection of the central line of the saw wire on a plane that is perpendicular to the longitudinal axis as viewed along the longitudinal axis. The 'shadow projection' is the projection of the complete wire as if illuminated from an infinitely distant light source i.e. inclusive the steel wire body.

If only one crimp deformation is present the saw wire will show a wavy shape in one plane, this plane being parallel with the crimp direction and the longitudinal axis i.e. the shape of the wire is planar. The parallel projection of the crimp deformation will evidently show the wavy shape.

When two crimp deformations are provided in two different crimp directions, both crimp directions laying in a plane perpendicular to the longitudinal axis, the saw wire will take a spatial shape in contrast with the planar shape when only one crimp deformation is present. In the spatial shape, the steel wire will deviate from the longitudinal axis in the two different crimp directions perpendicular to the longitudinal axis of the saw wire. However, the parallel projection of a particular crimp deformation will only show the crimp shape in that particular direction, the other crimp deformations will not show. The longitudinal projection of the saw wire shows a parallelogram shape when only two crimp directions are present.

The procedure can be extended to three crimp deformations: again the parallel projections of the first, second or third crimp, will only show the first, second or third crimp respectively, while the other crimp deformations will not show. The longitudinal projection will show a non-regular hexagon with parallel opposite edges if three crimp directions are involved. The procedure can be extended to four, five or more crimp directions.

Characteristic about the spool with saw wire is that it comprises a number of elastic rotations per unit length that are applied in the elastic rotation direction. For the purpose of this application a 'rotation' is a turning of the spatial shape of the wire around the longitudinal axis of the saw wire. With 'elastic rotations' is meant that these rotations are not permanently acquired by the saw wire. Preferably at least 0.5 to 10 elastic rotations per meter are present on the spool with saw wire. The number of elastic rotations may vary over the length of the saw wire between for example 0.5 to 5 rotations per meter or between 1 and 3 rotations per meter. The presence of elastic rotations on the spool with saw wire can easily be established. When withdrawing a length 'L' of saw wire from the spool with saw wire while holding the end of the wire rotationally fixed the elastic rotations remain in the wire as both ends cannot rotate freely. Upon release of the wire end the elastic rotations are liberated and the wire end will rotate. The number of rotations made by the wire end divided by the unwound length of wire 'L' is the number of elastic rotations per unit length. The length is chosen that at least one full rotation is liberated. For example when one full rotation is liberated over two meters of wire, the number of rotations per meter is 0.5 rotations per meter. The rotations will liberate in the rotation direction that is opposite to the rotation direction in which the rotations have been applied. Note that the presence of elastic rotations cannot be ascertained on a sample of saw wire where both ends have not been rotationally held fixed during sample taking.

The working of the invention is as follows: when the saw wire is unwound from the spool during normal regime of the wire saw, the work piece is presented with a saw wire that is rotating around its longitudinal axis when passing a fixed point, for example the entry of an ingot. The number of rotations made at entry per unit of time will be equal to the velocity of the wire multiplied by the number of elastic rotations per unit length. As both the pay-off spool and the take-up spool are fixed points that prevent the rotation of the saw wire, the number of elastic rotations between pay-off and take-up spool remains about constant and equal to the elastic rotations per unit length times the length of the wire path through the wire saw.

The two or more crimp deformations in the saw wire result in an improved transport of the abrasive particles through the cut. During sawing the saw wire abrades the work piece mainly at the bends of the crimps: the bends push the abrasive particles against the work piece while the straight segments in between the bends do not wear the work piece. As a result the force to pull the wire through is much less as the wear surface between wire and workpiece is reduced. In addition through the spaces in between the straight segments the swarf and debris can pass and do not obstruct the still active abrasive particles.

The first effect of the invention is that due to the rotary movement that results from the elastic rotations the slurry is also rotary agitated. This contributes to the removal of swarf and debris. A second effect of the invention is that due to the rotary movement of the saw wire the wire does not get the chance to find a preferred direction in case one crimp deformation would prevail over the other(s) and the wire would keep that direction. As soon as this would happen, rotations would build up in front of the cut until the torque on the wire becomes so high that the saw wire is forced to rotate again. Both first and second effects result in an increased surface quality of the cut wafers.

In a further refinement of the invention, the rotation of the crimp deformations can be made permanent along the longitudinal direction of the saw wire. All of the two or more crimp directions of the saw wire rotate then in a plastic rotation direction along the longitudinal axis with a number of plastic rotations per unit length. The rotation of the crimps is plastic i.e. permanent. Hence a length of saw wire that is cut from the spool of saw wire will still show a rotation of the crimp direction along its length, even when the ends are rotationally free to turn.

The number of elastic rotations is preferably between 0.5 to 10 rotations per meter, even more preferred between 0.5 to 5 or between 0.5 and 1 rotation per meter.

The rotation direction of the applied elastic rotation and the elastic rotation along the longitudinal axis can be opposite to one another. For example the plastic rotations can be in the clockwise direction while the elastic rotations can be applied in the counterclockwise direction. Such an arrangement is possible but less preferred as the rotations may annihilate one another.

More preferred is if the plastic rotation direction and the elastic rotation direction are equal. In that way the rotary effect at entry at the cut is even improved.

The sum of the number of plastic rotations and the number of plastic rotations is best between 0.5 and 20 rotations per meter. In the sum, account is taken of the proper sign i.e. opposite directions are subtracted from one another, like directions are added. If the sum is less than 0.5 rotations per meter no advantages effects are noticed during sawing. If the sum is larger than 20 rotations per meter there is the risk of 'jump-overs'. Jump-overs occur during sawing when in the wire web one of the wire exits its groove and settles in the neighbouring groove. More specific ranges is between 0.8 and 10 rotations per meter or between 0.8 and 5 rotations per meter or even between 0.8 and 2 rotations.

In a preferred embodiment of the invention the number of plastic rotations per unit length is less than the number of elastic rotations per unit length for example less than 3 in 10 rotations of the Wire are plastic rotations the remainder being elastic rotations. In an also preferred embodiment the number of plastic rotations is about equal to the number of elastic rotations. With about equal is meant that between 3 and 7 in 10 rotations are elastic rotations the remainder being plastic rotations.

In a preferred embodiment the number of crimp directions is equal to two. The two crimp directions are preferably between angles of 70° to 110° relative to one another. If the angle is less the longitudinal projection will show a flattened parallelogram. Such shape will restrict the saw wire in its rotation with an increased risk for saw marks as a consequence. If the angle is 90° the longitudinal projection will show a rectangular shape. Note that the angle between crimps must be measured locally—i.e. say within ten to hundred wavelengths—as the overall orientation of the two crimps may rotate along the length of the saw wire in case elastic rotations are present.

Each one of the crimp deformations will show a crimp wavelength in the parallel projection of that one crimp deformation. For all practical purposes the crimp wavelength is the average axial distance between two subsequent peaks on the same side of the axis. By preference an average of at least 30 wavelengths is taken. It is highly preferred that crimp wavelengths are mutually different from one another and are no multiple from one another. It is even more preferred if the wavelengths are coprime to one another. If the wavelengths are equal or are multiples from one another there is a risk that both crimps coalesce into a single crimp.

In the specific case of two crimp deformations in two crimp directions one can name the crimp deformation with the larger wavelength the first crimp deformation and the crimp deformation with the smaller wavelength the second crimp deformation. Preferably, the first crimp deformation has a wavelength that is strictly larger than the second crimp wavelength and the first crimp wavelength is strictly smaller than two times the second crimp wavelength. Even more preferred is if first wavelength is larger or equal to 1.10 times and is smaller or equal than 1.5 times the second wavelength.

Each one of said two or more crimp deformations will have a crimp amplitude. For the purpose of this application, the crimp amplitude of a crimp deformation is the distance between the lower and higher peak—'peak-to-peak'—of the central wire parallel projection of that crimp. The crimp amplitude is equal to the difference in height of the parallel shadow projection of that crimp deformation between a top and the bottom at one side of the shadow projection. If the difference between the crimp amplitudes is too large, there is the risk that the crimp deformation with the largest crimp amplitude will prevail and stop the wire from rotation in the cut. Therefore it is best that all crimp amplitudes of the two or more crimp deformations are within +/−40% of the average of the two or more crimp amplitudes; or, better, +/−30%, or even better, within +/−15% of the average of the two or more crimp amplitudes.

Due to the presence of the steel wire body, the ratios in diameter in the crimping directions will be abated. For the purpose of this application, the 'calliper diameter' measured in a certain direction in a plane perpendicular to the longitudinal axis of the saw wire is the distance between two parallel planes that touch the saw wire. The planes should at least cover twice the largest wavelength of a crimp. By determining the calliper diameter for any direction one can determine the minimum and maximum calliper diameter. The difference between maximum and minimum calliper diameter of the saw wire should remain below 10% of the average of the maximum and minimum calliper diameter. Even better is if the difference remains below 8% or even below 6% of that average.

The presence of two or more crimp deformations in the saw wire results in a steel wire with bends. In between the bends there are segments connecting subsequent, consecutive bends. At the bends the radius of curvature of the central line is much smaller than in the segments i.e. the curvature at the bends is much higher than in the segments. A bend is therefore characterised as a peak in the curvature when moving along the axial length of the saw wire. The average distance between subsequent bends can be measured by counting the number of bends over a measuring length 'L' (for example 100 mm or more) and to divide this length by the number of bends counted. Note that the distance between bends does not coincide with the wavelength of a crimp deformation as one wavelength shows two bends.

The average distance between subsequent bends along the longitudinal axis should be smaller than twenty times the wire diameter 'd' of the steel wire and larger than three times the steel wire diameter. If the distance between bends is too large the abrasive carrying capacity at the crimps is compromised. If the distance between bends is too small not enough abrasive is carried along and the swarf and abrasive debris will not filter through. Even more preferred is that the average distance between bends is from three to ten times the diameter of the steel wire.

In order to keep the elastic torsions on the spool it is recommended that the outer end of the saw wire i.e. the end that is available at the outside of the spool is rotationally fixed to the spool in order to prevent release of the elastic rotations.

BRIEF DESCRIPTION OF FIGURES IN THE DRAWINGS

FIG. 1 a, b and c show a prior art saw wire trace having two crimp deformations in mutual perpendicular directions as measured;

FIGS. 2 a, b and c shows the same prior art saw wire trace but now rotated to make the first and the second crimp deformation visible;

FIGS. 3 a, b and c shows the inventive saw wire with elastic and/or plastic torsions in the saw wire;

MODE(S) FOR CARRYING OUT THE INVENTION

Conventional prior art structured saw wires are made by guiding a fine, high tensile steel wire of 130 μm through two subsequent pairs of crimper wheels. The steel wire is formed in two subsequent crimping operations in mutually perpendicular directions. In the first crimping operation the wire is given a first crimp deformation i.e. a zig-zag shape wherein a straight segment connects two bends in opposite directions. The direction of the first crimp deformation lies in the plane formed by the zig-zag shape and is perpendicular to the longitudinal axis of the structured sawing wire. This planar wave is subsequently crimped in the direction perpendicular to the plane of the wave in a second crimping operation. First and second crimp deformations may have amplitudes and wavelengths that are different from one another. The resulting structured sawing wire shows the first crimp deformation in parallel projection on the plane formed by the first crimp direction and the longitudinal axis and the second crimp deformation in parallel projection on the plane formed by the second crimp direction and the longitudinal axis.

The shape of the structured saw wire can be measured by means of a KEYENCE LS 3034 laser scan system in combination with a KEYENCE LS 3100 processing unit such as described in WO 95/16816 (called 'trace scanner'). In this system a structured saw wire of about 20 cm length is held taut under a force of 1±0.2 N. The sample is fixed between two synchronously rotatable drill chucks. Care must be taken not to impose bending or torsion deformations to the wire when mounting. Then a diode laser head scans the wire along its longitudinal axis (the Z-axis) and the under and upper edge of the wire is recorded as a function of length 'z'. The average of the two values gives the position of the central line of the wire along the X-axis, perpendicular to the 'Z-axis' as a function of 'z' i.e. x(z). Then the fixation points are turned 90° and the scan is repeated. This results in the position of the central line of the wire along the Y-axis as a function of the 'z' coordinate i.e. y(z). Hence the parameter function (x(z),y(z),z) defines the shape of the central line of the saw wire in three dimensions. By loading this array into a spreadsheet program or any other suitable data analysis programme, one can visualize the trace in an enlarged view which is needed as the indentations are quite small. One can virtually rotate the trace by applying a rotation transformation to it or observe the projections from any desired angle.

Figure 1A:
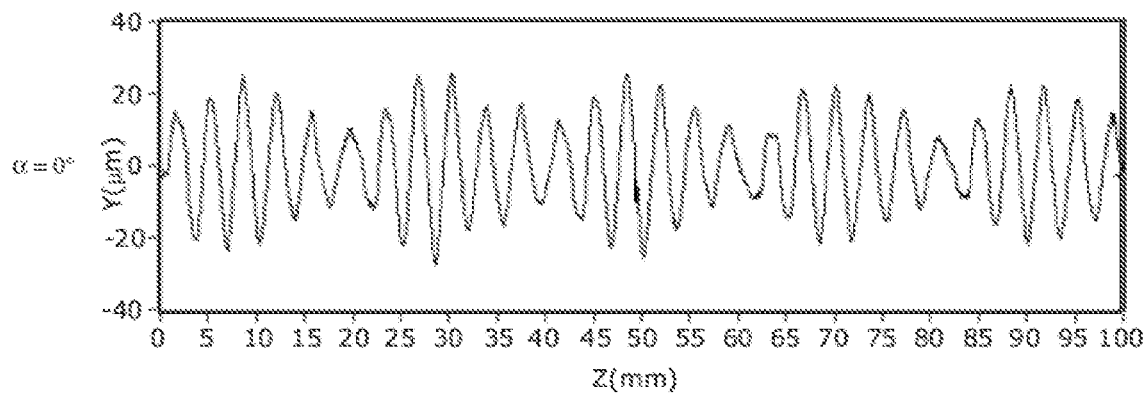
Figure 1B:
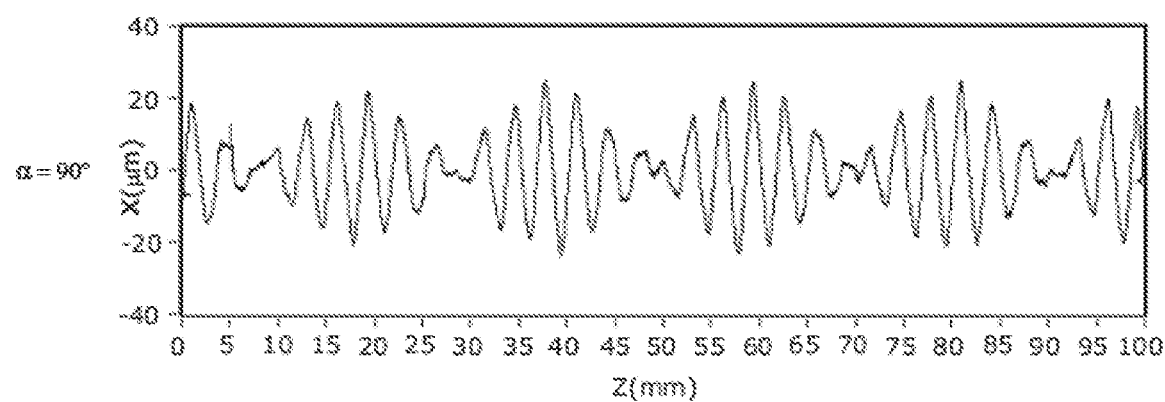
Figure 1C:
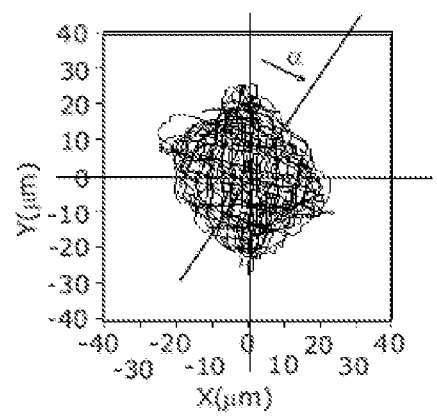

FIG. 1 shows the traces formed by the central line of a prior art saw wire as measured. FIG. 1a is the direction observed at 0° angle i.e. the free chosen angle at which the sample is mounted between the drill chucks. FIG. 1b shows the same sample but now rotated 90° when the second scan is taken. FIG. 1c shows the longitudinal projection of the saw wire. FIGS. 1a and 1b show traces that do not allow identification of any single crimp. The average wavelength of the wavy shape is 3.598 mm (standard deviation of 0.377 mm) and 3.542 (standard deviation of 0.800 mm) for FIGS. 1a and 1b respectively. FIG. 1c gives a hint that two mutual perpendicular crimps are present. Note that the longitudinal length along the Z-axis is expressed in millimetre while the vertical axis (X or Y) is expressed in micrometer i.e. the crimps are minute.

Figure 2A:
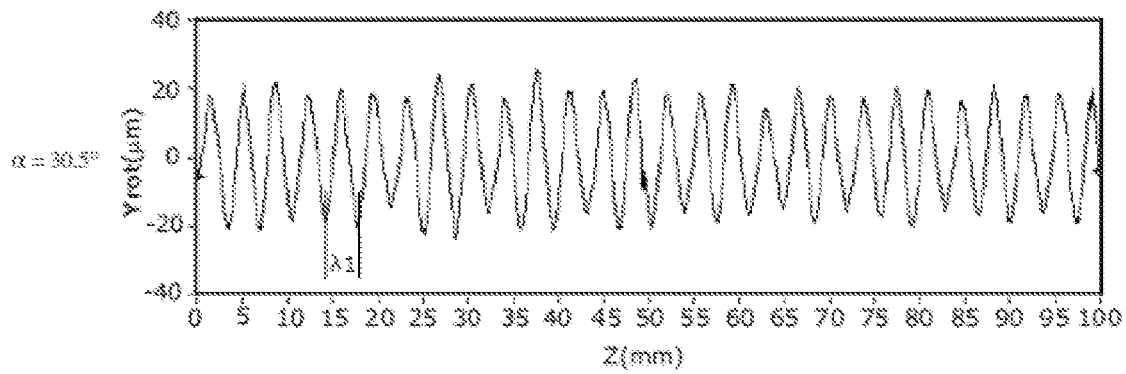
Figure 2B:
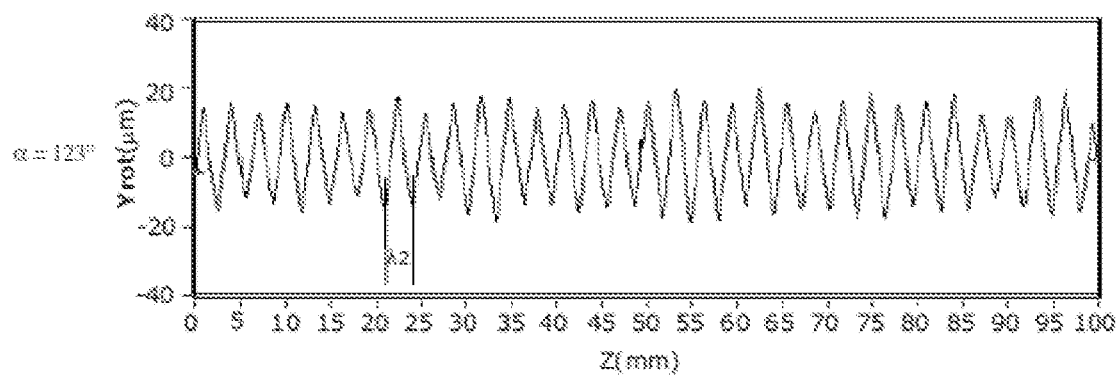
Figure 2C:
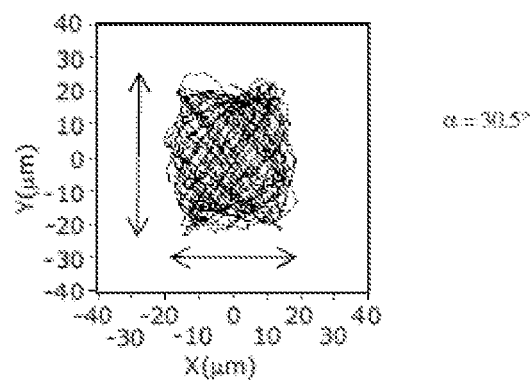

By now virtually rotating the wire one finds at 30.5° a first crimp deformation with a wavelength $\lambda_1$ of 3.617 mm and a minimum standard deviation of 0.098 mm: FIG. 2a. Further rotating gives a second crimp deformation at 123° with a wavelength $\lambda_2$ of 3.078 mm and a minimum standard deviation of 0.048 mm: FIG. 2b. These are the two parallel projections of the two crimp deformations. The angle between both crimp deformations is 123°-30.5° or 92.5° which is very close to perpendicular. In this way the crimp deformations of the wire can be disentangled. At the rotation angles of 30.5° and 123° the longitudinal projection (FIG. 2c) shows a Lissajous type of figure that is delimited by a rectangle that is aligned with the crimp direction of the first and second crimp. The first crimp amplitude is 38 μm, the second crimp amplitude is 30 μm.

Figure 4:
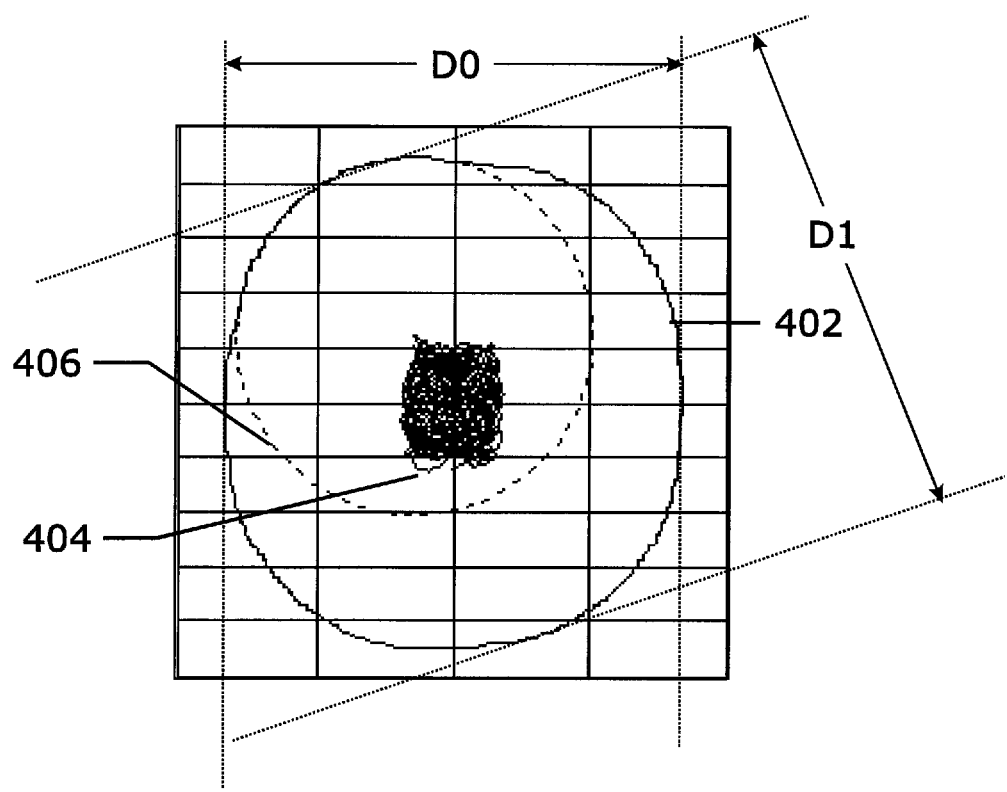
FIG. 4 shows the longitudinal shadow projection of the prior art saw wire.

FIG. 4 shows the longitudinal shadow projection of the prior art wire. In this projection account has been taken of the steel wire 406 body with a diameter of 130 μm. The outer envelope of the saw wire is indicated with 402. All steel wire remains within this envelope. The central wire longitudinal projection is indicated with 404. Different calliper diameter D0 and D1 are shown. The shape of the central rectangle is reflected in the shape of the envelope that shows large differences in calliper diameter of the circumference. D0 is the minimum calliper diameter of 168.0 μm, D1 is the maximum calliper diameter of 185.6 μm. The maximum and minimum diameters differ by 10% of their average value. Such a wire may—during sawing—intermittently get blocked in a preferred direction for a certain cutting length. The wafer parametrics such as total thickness variation and saw marks are adversely affected by this phenomenon.

In order to overcome this defect the inventors made a spool of saw wire wherein elastic torsions or elastic and plastic torsions have been incorporated in the saw wire wound on the spool.

Figure 7:
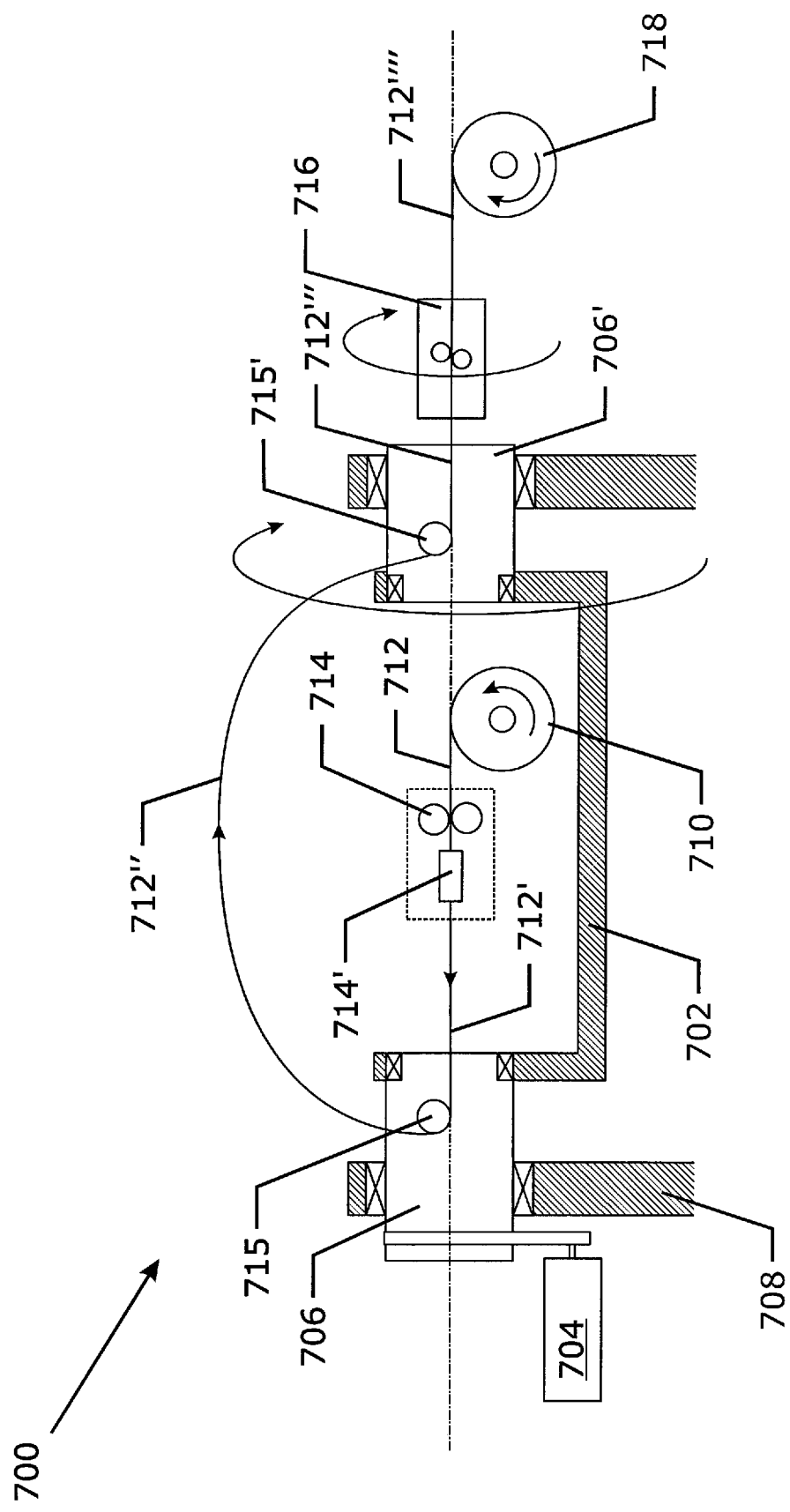
FIG. 7 shows how a spool with saw wire with plastic and elastic rotations can be made.

In order to induce elastic or plastic rotations onto a saw wire on a spool, the inventors used the process as depicted in FIG. 7. FIG. 7 shows a double twister 700 that is built on a firm stand 708 and comprises two rotation shafts 706 and 706' that are synchronously driven by motor 704. The two rotation shafts 706, 706' carry a cradle 702 that is rotationally supported between rotation shafts 706, 706' and hangs stationary when the rotation shafts rotate in the indicated direction (the arrow). A pay-off spool 710 with straight wire 712 is mounted on the cradle 702 and guided to a first pair of crimper wheels 714. There the wire obtains a first crimp deformation in a first crimp direction. The resulting planar waved wire is guided through a second pair of crimper wheels 714' of which the axes are mounted perpendicular to the axis of the first pair of crimper wheels. The resulting wire 712' shows two crimp deformations with crimp directions that are mutually perpendicular to one another.

The wire 712' is subsequently guided over reversing pulley 715. Due to the rotary movement of the shafts 706, 706' the wire is twisted around its first axis with a rotation amount 'RA' per meter that is equal to the number of turns the shafts 706, 706' makes per minute divided by the linear speed of the wire. The wire 712" moves through a flyer or through air to the second reversing pulley 715'. There the wire receives a second rotation amount RA per meter that is equal to the first amount and in the same twisting direction. The saw wire 712''' that results has thus received 2RA rotations per meter.

Figure 8:
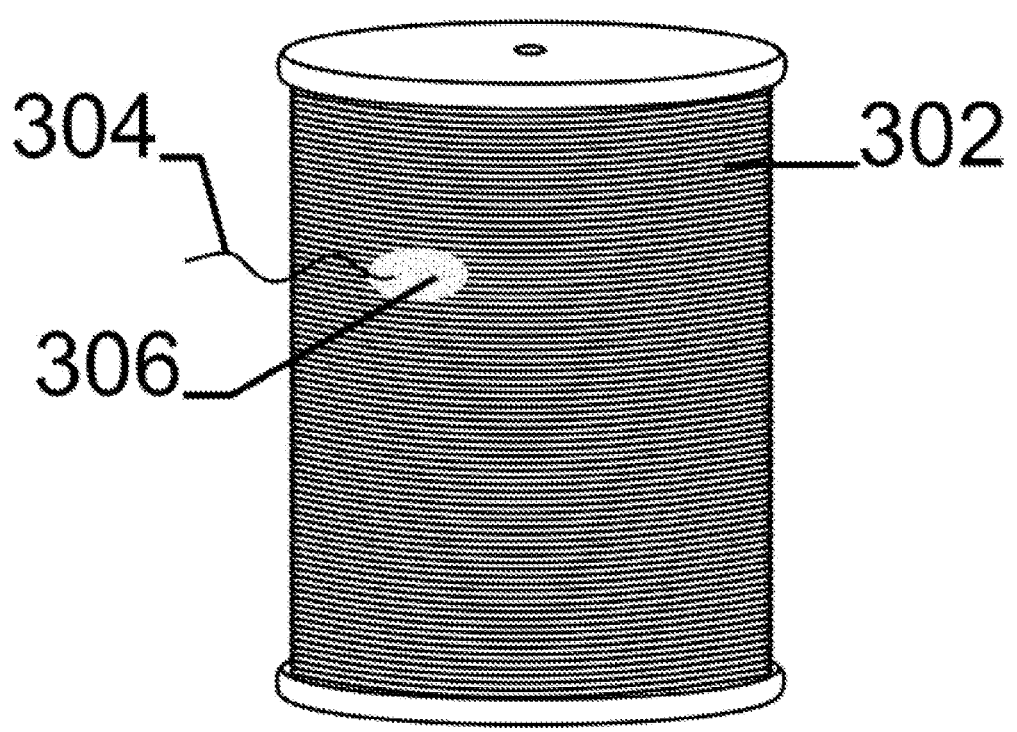
FIG. 8 shows an embodiment of the spool with saw wire, the spool being rotationally fixed to the spool in order to prevent release of the elastic rotations.

Optionally the wire is guided through a false twister device 716 that turns in the same direction as the shafts but possibly with a different number of rotations per minute. The saw wire leaves the device 716 as 712''' and is spooled on a spool 718 having a core and this is the spool with saw wire according the invention. FIG. 8 shows an embodiment of a bobbin with a saw wire 302. The saw wire 302 can have a saw wire end 304 (i.e., an outer end). The saw wire end 304 can be rotationally fixed to prevent release of the elastic rotations by, for example, a glue dot 306.

In order to introduce an amount of elastic torsions on the wire it suffices that the amount of rotations induced on the wire 2RA is well below the rotational elastic limit of the steel wire. The 'rotational elastic limit' REL is the highest number of rotations that when twisted onto the wire will also elastically release from the wire. So if a number of rotations that is larger than REL are induced to the wire, only REL rotations will be liberated out of the wire upon release. Hence as long as 2RA<REL the number of elastic rotations found back on the saw wire will be 2RA.

Figure 6:
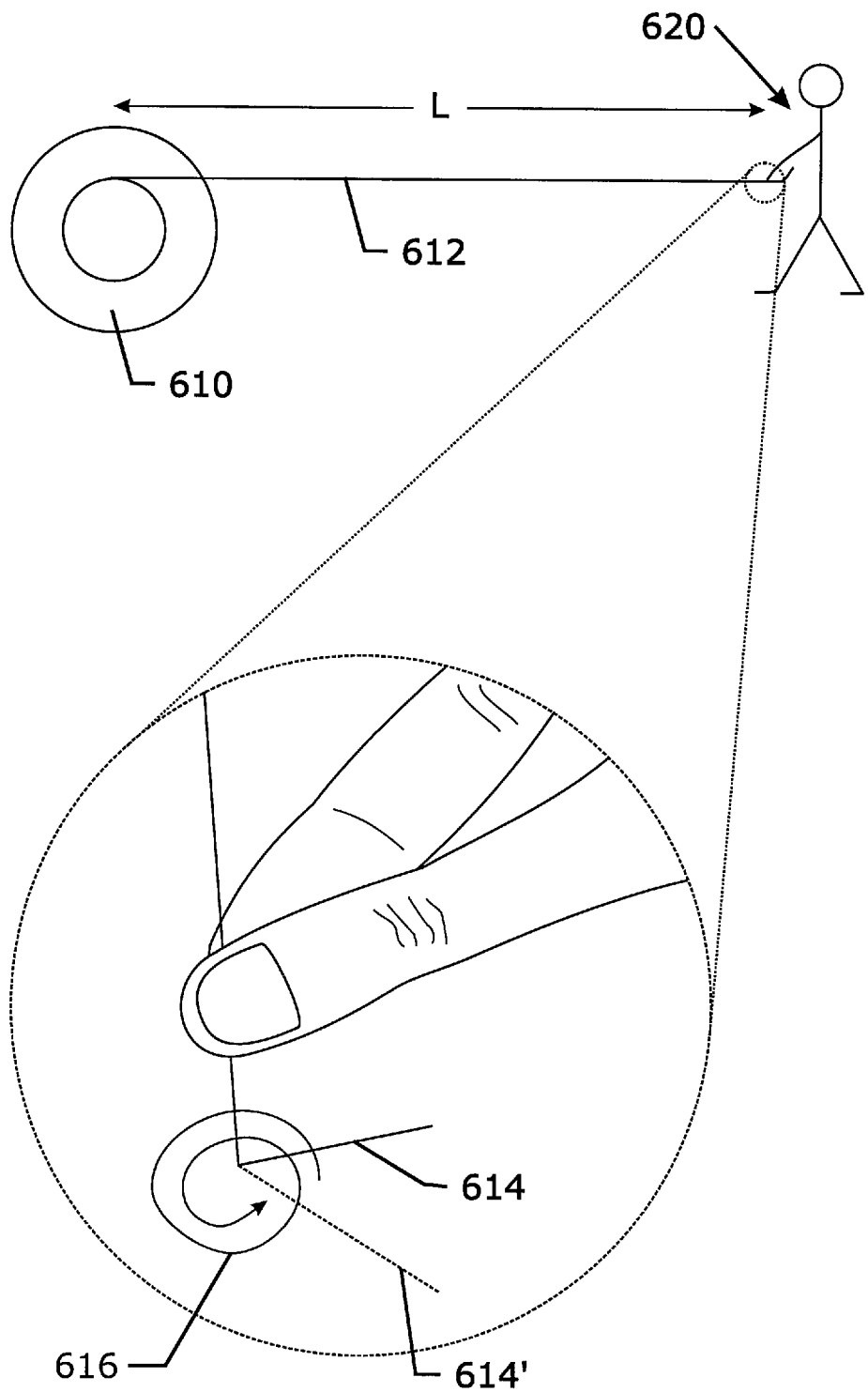
FIG. 6 shows how elastic rotations can be measured on a spool.

Whether or not a spool with saw wire incorporates elastic rotations can be easily established as illustrated in FIG. 6. A spool with saw wire 610 is mounted on a pay off stand. The tester 620 withdraws a length 'L' of saw wire 612 from the spool while keeping the end of the wire fixed between thumb and index finger. A length 'L' of 1 to 3 meter provides enough accuracy. A hook 614 is made to the end of the saw wire. Upon release of the finger grip the amount of rotations released 616 is counted to the nearest quarter turn. In case the number of rotations is less than one the measuring length 'L' is increased until the number of rotations is larger than 1. The number of turns (inclusive quarter turns) counted is divided by the length 'L' of the saw wire to obtain the number of rotations per meter.

When the number of applied rotations 2RA is larger than REL, REL rotations will be present in the saw wire as elastic rotations while 2RA-REL rotations will remain as plastic rotations. However, for very fine steel wires with a high tensile strength the REL value is very high (more than 90 rotations per meter) resulting in more than 90 elastic rotations coming out of the saw wire. This is unacceptable for use. In order to abate the elastic residual torsions a false twister 716 is introduced. The false twister 716 over-twists the wire with FT false twists per meter in the plastic region and thereafter takes out the same number FT of elastic rotations out. What remains is a saw wire with a number of plastic rotations and a number of elastic rotations that are controlled by the speed of the false twister. If the number FT of false twists added is equal to REL, there are no elastic rotations in the resulting saw wire. When FT is smaller than REL there remain elastic rotations applied in the same direction as that of the plastic rotations. When FT is higher than REL there remain elastic rotations applied in the opposite direction as that of the plastic rotations.

Figure 3A:
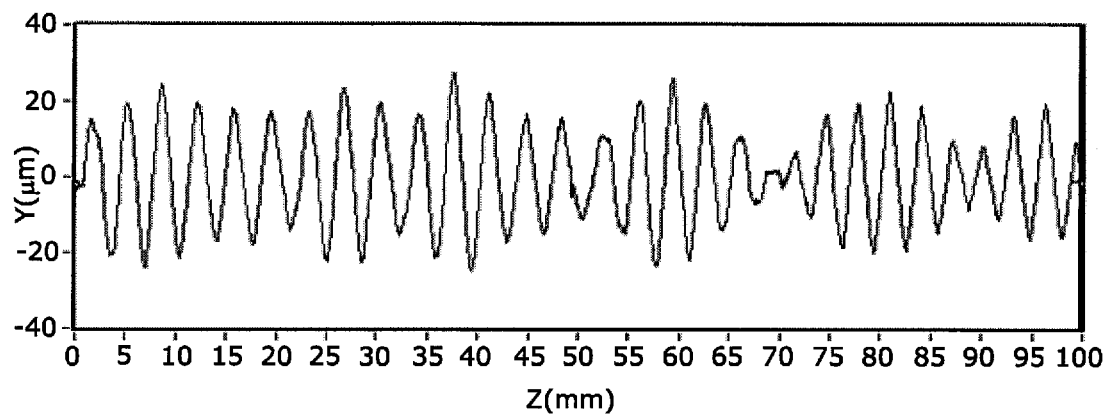
Figure 3B:
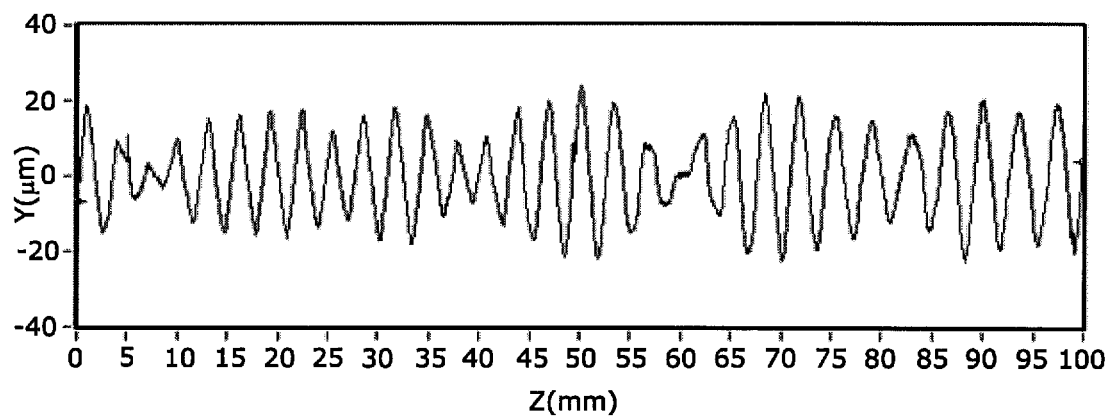
Figure 3C:
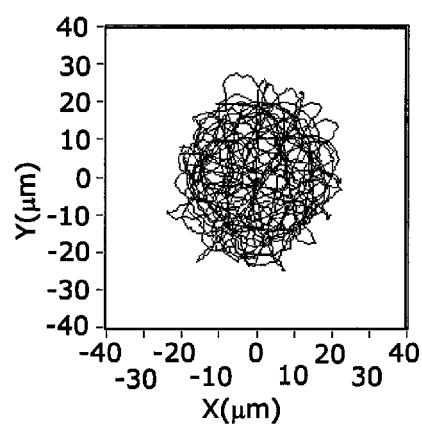
Figure 5:
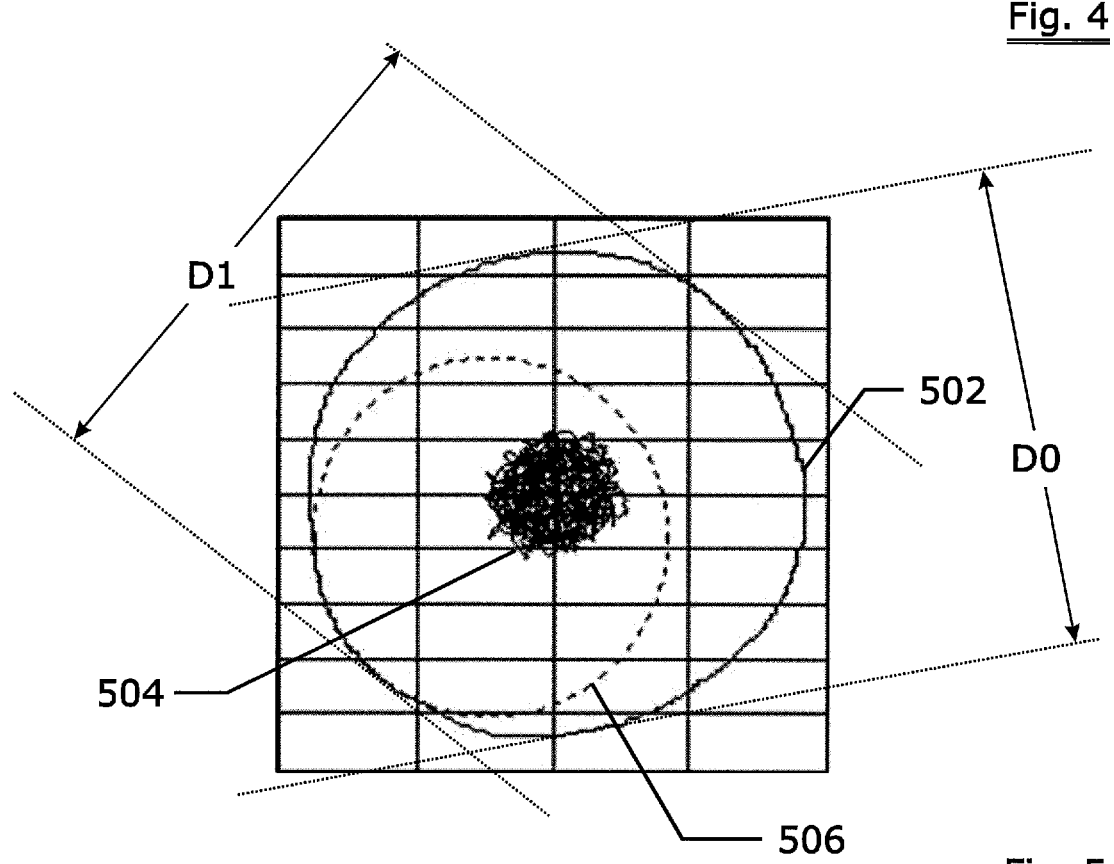
FIG. 5 shows the longitudinal shadow projection of the inventive saw wire.

FIG. 3 a and b show projections of the same crimped wire as of FIGS. 1 and 2 wherein 3.5 plastic rotations per meter have been induced. The projections are X-Z and Y-Z projections mutually orthogonal to one another. The longitudinal projection (on the X-Y plane) does not show the rectangular feature over the measuring length of 100 mm. 100 mm is representative for the length of the wire in the cut. The longitudinal shadow projection of this wire is shown in FIG. 5. Again the longitudinal projection of the central wire 504 is indicated and the envelope of the shadow projection 502 of steel wire 506. The maximum caliper diameter D1 of 185.6 μm and minimum caliper diameter D0 of 175.3 μm is indicated. The difference between maximum and minimum caliper diameter is now 5.7% of the average diameter i.e. the workpiece is confronted with a rounder saw wire. The effect of elastic rotations on the shadow projection is equal to that of the plastic rotations.

Whether or not a saw wire comprises plastic rotations such as shown in FIG. 3, a, b and c can also be established based on the trace recorded by the trace scanner. A virtual backtwist can be given to the wire wherein a number of plastic rotations are turned out evenly over the complete length of the wire trace whereby the end at z=0 is held fixed and the end at z=100 mm is turned back. When turning back the trace of FIGS. 3 a, b and c, the trace of FIG. 1c emerges. From that longitudinal projection it is possible to derive the first and second crimp deformations properties. Hence it is possible to establish the number of plastic rotations given to the saw wire. In this case the profile had to be turned back 1.26° per mm.

Both a conventional double crimped structured sawing wire without elastic and plastic rotations (Prior art') and a wire with elastic rotations (about 1 rotation per meter) and plastic rotations (0.25 rotations per meter) ('Invention') have been tested in two different saw tests ('Case 1', 'Case 2'). During the test the table speed was stepwise increased until maximum. The maximum allowable table speed is shown in Table 1.

TABLE 1

| Table speed | Prior art (mm/min) | Invention (mm/min) |
|---|---|---|
| Case 1 | 0.35 | 0.70 |
| Case 2 | 0.40 | 0.75 |

With the inventive wire a much higher sawing speed can be obtained (the table speed corresponds to the speed of cutting). As the wire feed speed was not different between sawing with the prior art and inventive saw wire, more wafers can be sawn with the inventive wire than with the prior art wire. In addition the number of wafers sawn per unit of time increases i.e. the throughput increases.

Over and above the wafer parametrics of all wafers was better with the inventive wire compared to the prior art saw wire:

The maximum saw mark depth range drops from [21 μm; 48 μm] for the prior art wire, to [16 μm to 27 μm] for the inventive saw wire.

The total thickness variation of wafers varies between [2.8; 31.5] μm for the prior art wire and between [3.1; 13.6] μm for the inventive wire.

The data indicate that a substantial improvement of wafer parametrics in combination with an increased throughput and less wire usage can be obtained when using a spool with saw wire having elastic and plastic rotations.

What is claimed is:

1. A spool with saw wire,
said spool comprising a core whereon saw wire is wound,
said saw wire having a longitudinal axis,
said saw wire comprising a steel wire,
said steel wire being provided with two or more crimp deformations;
each one of said two or more crimp deformations having a crimp direction;
each one of said crimp directions being perpendicular to said longitudinal axis; said crimp directions being mutually different from one another;
wherein
said saw wire comprises a number of elastic rotations per unit length around said longitudinal axis applied in the elastic rotation direction, and
wherein the number of said elastic rotations is between 0.5 and 10 rotations per meter.

2. The spool with saw wire according to claim 1, wherein all of said two or more crimp directions of said saw wire rotate in a plastic rotation direction along said longitudinal axis with a number of plastic rotations per unit length.

3. The spool with saw wire according to claim 2, wherein said number of plastic rotations per unit length is between 0.5 and 10 rotations per meter.

4. The spool with saw wire according to claim 2, wherein the plastic rotation direction and the elastic rotation direction are opposite.

5. The spool with saw wire according to claim 2, wherein the plastic rotation direction and the elastic rotation direction are equal.

6. The spool with saw wire according to claim 2, wherein the sum of the number of plastic rotations and the number of elastic rotations is between 0.5 and 20 rotations per meter.

7. The spool with saw wire according to claim 1, wherein the number of said crimp deformations is two.

8. The spool with saw wire according to claim 7, wherein said two crimp directions have an angle between 70° to 110° to one another.

9. The spool with saw wire according to claim 1, wherein each of said two or more crimp deformations have a crimp wavelength, each of said crimp wavelengths being mutually different from one another.

10. The spool with saw wire according to claim 9, wherein the number of crimp deformations is two and wherein the first crimp wavelength is larger than the second crimp wavelength and the first crimp wavelength is smaller than twice the second crimp wavelength.

11. The spool with saw wire according to claim 1, wherein each of said two or more crimp deformations have a crimp amplitude, each of said crimp amplitudes being within +/−40% of the average of the crimp amplitude of said two or more crimp deformations.

12. The spool with saw wire according to claim 11, wherein the difference between maximum and minimum caliper diameter of the saw wire is less than 10% of the average of maximum and minimum calliper diameter.

13. The spool with saw wire according to claim 1, wherein said steel wire has a wire diameter wherein each of said two or more crimp deformations comprises a bend with a segment, each segment being in between respective bends, wherein an average distance between each bend along said longitudinal axis is between three and twenty times said wire diameter.

14. The spool with saw wire according to claim 1, wherein said saw wire has an outer end, said outer end being rotationally fixed to prevent release of said elastic rotations.

* * * * *